United States Patent [19]
Justice et al.

[11] Patent Number: 5,961,415
[45] Date of Patent: Oct. 5, 1999

[54] SINGLE CAVITY TOROIDAL TRACTION DRIVE CONTINUALLY VARIABLE TRANSMISSION

[75] Inventors: Clinton Frederick Justice, Northville; Albert John Nielsen, Plymouth; Robert Clayton Roethler, Howell, all of Mich.

[73] Assignee: Ford Global Technologies, Inc., Dearborn, Mich.

[21] Appl. No.: 09/156,196

[22] Filed: Sep. 17, 1998

[51] Int. Cl.⁶ ........................................ F16H 3/64
[52] U.S. Cl. ............................................ 475/214
[58] Field of Search .............................. 475/214

[56] References Cited

U.S. PATENT DOCUMENTS 4,297,918  11/1981  Perry .
4,344,336   8/1982  Carriere .
4,355,547  10/1982  Poole et al. .
4,449,423   5/1984  Carroere .
4,464,952   8/1984  Stubbs .
4,481,844  11/1984  Ironside et al. .
4,638,687   1/1987  Perry .
5,879,260   3/1999  Yoshida et al. .................. 475/214

*Primary Examiner*—Dirk Wright
*Attorney, Agent, or Firm*—Frank G. McKenzie

[57] ABSTRACT

An automatic transmission for an automotive vehicle includes a traction drive variator having an input disc, an output disc, and rollers driveably engaged with the discs and adapted to vary continuously the ratio of the speeds of the output disc and input disc. The input disc is reversed and overdriven by a gearset whose ring gear is connected to an input shaft; carrier is held permanently; and sun gear drives the input disc. A planetary gear unit driven by the output disc produces a speed reduction in response to alternate engagement of a forward drive brake and reverse drive brake.

11 Claims, 1 Drawing Sheet

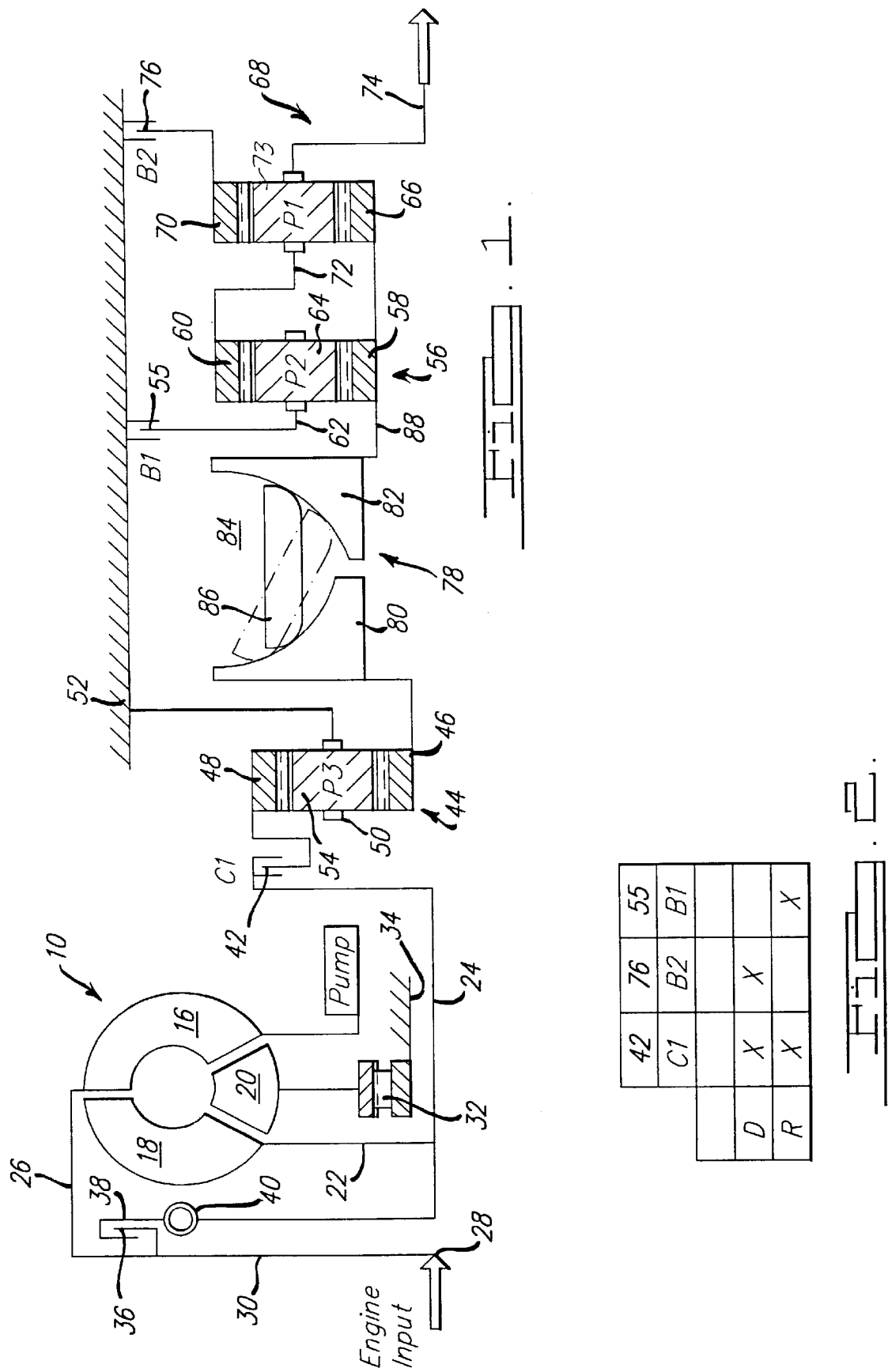

5,961,415

SINGLE CAVITY TOROIDAL TRACTION DRIVE CONTINUALLY VARIABLE TRANSMISSION

BACKGROUND OF THE INVENTION

1. Field Of The Invention

The present invention relates to automatic transmissions for automotive vehicles; more particularly, it pertains to a continuously variable transmission (CVT) of the toroidal traction variator type.

2. Description Of The Prior Art

Continuously variable transmissions of the toroidal race-rolling traction variator type are well known. CVTs of this type provide a continuously variable range of transmission ratios through the arrangement of possibly more than one epicyclic gear train. The engine drive variator has an output disc that delivers power to an epicyclic gear train that is also driven by an output shaft. More specifically, a variator output disc directly drives a sun gear of a planetary gearset.

CVT units of the toroidal race-rolling traction type wherein the output disc directly drives a sun gear of a planetary gearset are described in U.S. Pat. No. 4,756,211, EP Document 84,724, U.K. Patent 1,228,749, and U.K. Patent 2,136,893.

Multiple planetary gearsets incorporating a CVT transmission of the toroidal traction type is described in U.S. Pat. No. 4,768,398. The drive system described there includes two epicyclic gearsets. A first gearset provides a compound planet system by way of a second set of gears in the system. The annulus of the first epicyclic gearing provides drive to a final drive shaft and provides reverse drive by way of a second set of gears. Depending on the variator ratio, the first epicyclic gearing provides a forward speed, neutral or a reverse speed in low regime. The annulus of the second epicyclic gearing provides drive to the final drive shaft in high regime. This method, as well as those of the other mentioned patents, requires complex gearset arrangements.

It is therefore desirable to create a simpler but just as effective drive method.

SUMMARY OF THE INVENTION

It is an object of this invention to provide an automatic transmission having a continuously variable ratio range utilizing a toroidal-race rolling traction drive.

It is another object of this invention to provide a traction drive transmission having a torque reduction gearset located between the input shaft and the variator input disc. This arrangement allows the variator to operate under a combination of conditions best suited to its characteristics, i.e., low torque and high speed. A simple planetary gearset having its carrier held ring gear connected to the input and sun gear connected to the variator input overdrives the variator in the opposite direction with respect to the transmission input.

According to an embodiment of the invention, there is provided a continuously variable transmission for an automatic transmission of an automotive vehicle comprising an input shaft; an output shaft; a traction drive variator including a first disc, a second disc, and rollers driveably engaging the first disc and second disc at variable radial positions, for producing slower rotational speed at the second disc than the speed at the first disc; a first gearset driveably connected to the input shaft and variator for overdriving the first disc in relation to the speed of the input shaft; a clutch for alternately driveably connecting and releasing the input shaft and first gearset; a planetary gear unit driveably connected to the second disc and output shaft for producing greater torque and slower rotational speed at the output shaft than the torque and speed at the second disc; a reverse drive brake for alternately holding against rotation and releasing a first component of the planetary gear unit, thereby producing reverse drive; and a forward drive brake for alternately holding against rotation and releasing a second component of the planetary gear unit, thereby producing forward drive.

The gear unit may include planetary gearsets, each having a sun gear driveably connected to the second disc; ring gears; carriers; and a set of planet pinions rotatably supported on a respective carrier and driveably engaged with a respective sun gear and ring gear.

BRIEF DESCRIPTION OF THE DRAWINGS

FIG. 1 is a schematic diagram of a continuously variable traction drive transmission.

FIG. 2 is schedule of the clutch and brake engagement and disengagement corresponding to the ranges of the transmission of FIG. 1.

DESCRIPTION OF A PREFERRED EMBODIMENT

In the cross section of the transmission seen in FIG. 1, numeral 10 designates a hydrokinetic torque converter located in a transmission housing.

The converter 10 includes a bladed impeller 16, a bladed turbine 18 and a bladed stator 20. The converter elements 16, 18 and 20 form a toroidal fluid flow path in known fashion, whereby impeller torque is multiplied hydrokinetically to produce a turbine torque that is transmitted through turbine hub 22 to the turbine shaft or input shaft 24. The impeller is enclosed within an impeller housing 26, which is connected at 28 to an engine crankshaft through the hub of a drive plate 30, the latter being secured to the outer periphery of the impeller housing 26.

Stator 20 is mounted on a one-way brake 32 and is supported by stationary stator support 34.

A torque bypass clutch generally shown at 36 includes a clutch plate 38 adapted to engage driveably impeller housing 26. It is secured to turbine shaft 24 by means of a damper assembly 40.

Shaft 24 is driveably connected through operation of a friction clutch 42 to a first planetary gearset 44, planetary gear unit, variator 78 of the toroidal traction drive type, and various elements driveably connecting components of the variator and the gearsets.

Planetary gearset 44 includes a sun gear 46; ring gear 48 surrounding the sun gear, planet carrier 50, driveably permanently held against rotation on the transmission case 52; and a set of planet pinions 54, supported rotatably on carrier 50 in continuous meshing engagement with ring gear 48 and sun gear 46.

Planetary gearset 56 includes a sun gear 58; ring gear 60 surrounding the sun gear, planet carrier 62, driveably connected to output shaft 74; and a set of planet pinions 64 supported rotatably on carrier 62 and in continuous meshing engagement with ring gear 60 and sun gear 58. Carrier 62 is alternately held against rotation on the case and released to rotate freely through operation of brake 55.

Sun gear 58 is permanently connected to sun gear 66 of a third planetary gear unit 68, which includes a ring gear 70, planet carrier 72, and a set of planet pinions 73 rotatably supported on carrier 72. Ring gear 60 is permanently driveably connected to carrier 72, which drives output shaft 74.

Brake 76 alternately driveably holds sun gear 70 against rotation on the case 52 and releases that gear for free rotation.

Toroidal variator 78 includes input disc 80, output disc 82, a toroidal cavity 84 defined by the interior surfaces of discs 80, 82, and a set of spaced, rotating, angularly displaceable rollers 86, each roller driveably engaged with the input disc and output disc. The rollers transmit torque between disc 80 and disc 82. A ratio control mechanism tilts or rotates the axis of the rollers, thereby changing the radial location of contact of the rollers on the discs and, in that way, the ratio of the speed of the output disc and speed of the input disc. Input disc 80 is driveably connected through the torque converter, input shaft 24, clutch 42 and gearset 44 to the engine shaft 28. Output disc 82 is driveably connected by member 88 to sun gears 58,66 which are permanently connected mutually.

The angular position of the set of rollers 86 located in the toroidal cavity 84 is tilted on trunnions about an axis directed substantially normal to the longitudinal axis. In this way, disc 82 is driven faster than disc 80 when rollers 86 are tilted so they contact disc 82 at a radially inner position and disc 80 at a radially outer position. When rollers 86 are tilted in the opposite angular direction, disc 80 drives disc 82 slower than the speed of disc 80. Disc 82 rotates in the opposite direction from that of disc 80.

In one application of this invention, preferably the sun gears each have 47 teeth, ring gears 60, 70 have 133 teeth, pinions 64, 73 each have 43 teeth, pinion 54 has 46 teeth, and ring gear 48 has 139 teeth. The speed ratio range produced by variator 78 is preferably in the range 4:1 for the low-range and 0.5:1 for the high range and 1:1 for the intermediate range.

When the engine is idling and the transmission is set for forward, neutral or reverse drive operation, clutch 42 preferably disengages to conserve energy and avoid wear due to slipping that clutch.

A forward-low range having a speed 0.193 times that of the engine is produced by engaging brake 76 and clutch 42, and by setting the angular position of the rollers 86 so that output disc 82 and sun gears 58,66 rotate at 0.739 times the speed of the input shaft 24. The speed of sun gear 46 and disc 80 is −2.957 times input shaft speed. Sun gear 66 is driven through the variator and gearset 44, ring gear 70 is held, and the output is taken at carrier and output shaft 74.

A forward overdrive or high range having an overall speed ratio of 1.544 is produced by engaging clutches 42 and brake 76, and setting the angular position of rollers 86 so that the output disc 82 rotates at 5.915 times input shaft speed. The speed of disc 80 and sun gear 46 is −2.957 times engine speed due to the speed reduction produced by gearset 44. Sun gear 66 is driven by disc 82 in the same direction as input shaft 24, and the output is taken at carrier 72 and shaft 74.

Reverse drive results by engaging clutch 42 and brake 55, and by disengaging brake 76. This action shifts the torque reaction from ring gear 70 to carrier 62 and drives ring gear 60, carrier 72 and shaft 74 opposite the direction of disc 82. The output is 0.353 times the speed of disc 82, which is about 0.739 times the speed of shaft 24. Preferably the speed ratio of variator 78 is 4:1 for both the reverse and low forward ranges.

Although the form of the invention shown and described here constitutes the preferred embodiment of the invention, it is not intended to illustrate all possible forms of the invention. Words used here are words of description rather than of limitation. Various changes in the form of the invention may be made without departing from the spirit and scope of the invention as disclosed.

We claim:

1. A continuously variable transmission for a motor vehicle having a power source, comprising:
    an input shaft;
    an output shaft;
    a traction drive variator including a first disc, a second disc, and rollers driveably engaging the first disc and second disc at variable radial positions, for varying the rotational speed at the second disc in relation to the speed at the first disc;
    a first gearset driveably connected to the input shaft and variator for overdriving the first disc in relation to the speed of the input shaft;
    a clutch for alternately driveably connecting and releasing the input shaft and first gearset;
    a planetary gear unit driveably connected to the second disc and output shaft for producing greater torque and slower rotational speed at the output shaft than the torque and speed at the second disc;
    a reverse drive brake for alternately holding against rotation and releasing a first component of the planetary gear unit, thereby producing reverse drive; and
    a forward drive brake for alternately holding against rotation and releasing a second component of the planetary gear unit, thereby producing forward drive.

2. The transmission of claim 1 wherein the first gearset comprises:
    a first sun gear driveably connected to the first disc, a first ring gear driveably connected to the clutch, a first carrier fixed against rotation, and a first set of planet pinions rotatably supporting on the first carrier and driveably engaged with the first sun gear and first ring gear; and
    the clutch alternately driveably connects and releases the input shaft and first ring gear.

3. The transmission of claim 1 wherein the gear unit further comprises:
    a second gearset including a second sun gear, a second ring gear, a second carrier connected driveably to the reverse brake, and a second set of planet pinions rotatably supporting on the second carrier and driveably engaged with the second sun gear and second ring gear; and
    a third gearset including a third sun gear connected mutually to the second sun gear and second disc, a third ring gear connected driveably to the forward brake, a third carrier driveably connected to the second ring gear and output shaft, and a third set of planet pinions rotatably supporting on the third carrier and driveably engaged with the third sun gear and third ring gear;
    the reverse drive brake alternately holds against rotation and releases the second carrier; and
    the forward drive brake alternately holds against rotation and releases the third ring gear.

4. The transmission of claim 1 further comprising:
    a torque converter including a bladed impeller wheel driveably connected to a power source, a bladed turbine wheel driveably connected to the input shaft, and a bladed stator wheel, the impeller, turbine and stator wheel disposed in toroidal fluid flow arrangement, for hydrokinetically driveably connecting the impeller and turbine.

5. A continuously variable transmission for a motor vehicle having a power source, comprising:

an input shaft;

an output shaft;

a traction drive variator including a first disc, a second disc, and rollers driveably engaging the first disc and second disc at variable radial positions, for driving the second disc in an opposite rotary direction from the direction of the first disc;

a first gearset driveably connected to the input shaft and variator for overdriving the first disc in relation to the speed of the input shaft and reversing the direction of rotation of the first disc in relation to the rotary direction of the input shaft;

a clutch for alternately driveably connecting and releasing the input shaft and planetary gear unit;

a planetary gear unit driveably connected to the second disc and output shaft for producing greater torque and slower rotational speed at the output shaft than the torque and speed at the second disc;

a reverse drive brake for alternately holding against rotation and releasing a first component of the planetary gear unit, thereby producing reverse drive;

a forward drive brake for alternately holding against rotation and releasing a second component of the planetary gear unit, thereby producing forward drive.

6. The transmission of claim 5 wherein the first gearset comprises:

a first sun gear driveably connected to the first disc, a first ring gear driveably connected to the clutch, a first carrier fixed against rotation, and a first set of planet pinions rotatably supporting on the first carrier and driveably engaged with the first sun gear and first ring gear; and the clutch alternately driveably connects and releases the input shaft and first ring gear.

7. The transmission of claim 5 wherein the gear unit further comprises:

a second gearset including a second sun gear, a second ring gear, a second carrier connected driveably to the reverse brake, and a second set of planet pinions rotatably supporting on the second carrier and driveably engaged with the second sun gear and second ring gear; and a third gearset including a third sun gear connected mutually to the second sun gear and second disc, a third ring gear connected driveably to the forward brake, a third carrier driveably connected to the second ring gear and output shaft, and a third set of planet pinions rotatably supporting on the third carrier and driveably engaged with the third sun gear and third ring gear;

the reverse drive brake alternately holds against rotation and releases the second carrier; and the forward drive brake alternately holds against rotation and releases the third ring gear.

8. The transmission of claim 5 further comprising:

a torque converter including a bladed impeller wheel driveably connected to a power source, a bladed turbine wheel driveably connected to the input shaft, and a bladed stator wheel, the impeller, turbine and stator wheel disposed in toroidal fluid flow arrangement, for hydrokinetically driveably connecting the impeller and turbine.

9. A continuously variable transmission for a motor vehicle having a power source, comprising:

an input shaft;

an output shaft;

a traction drive variator including a first disc, a second disc, and rollers driveably engaging the first disc and second disc at variable radial positions;

a first gearset including a first sun gear driveably connected to the first disc, a first ring gear driveably connected to the clutch, a first carrier fixed against rotation, and a first set of planet pinions rotatably supporting on the first carrier and driveably engaged with the first sun gear and first ring gear;

a clutch for alternately driveably connecting and releasing the input shaft and first ring gear;

a planetary gear unit driveably connected to the second disc and output shaft for producing greater torque and slower rotational speed at the output shaft than the torque and speed at the second disc;

a reverse drive brake for alternately holding against rotation and releasing a first component of the planetary gear unit, thereby producing reverse drive; and a forward drive brake for alternately holding against rotation and releasing a second component of the planetary gear unit, thereby producing forward drive.

10. The transmission of claim 9 wherein the gear unit further comprises:

a second gearset including a second sun gear, a second ring gear, a second carrier connected driveably to the reverse brake, and a second set of planet pinions rotatably supporting on the second carrier and driveably engaged with the second sun gear and second ring gear; and a third gearset including a third sun gear connected mutually to the second sun gear and second disc, a third ring gear connected driveably to the forward brake, a third carrier driveably connected to the second ring gear and output shaft, and a third set of planet pinions rotatably supporting on the third carrier and driveably engaged with the third sun gear and third ring gear;

the reverse drive brake alternately holds against rotation and releases the second carrier; and the forward drive brake alternately holds against rotation and releases the third ring gear.

11. The transmission of claim 9 further comprising:

a torque converter including a bladed impeller wheel driveably connected to a power source, a bladed turbine wheel driveably connected to the input shaft, and a bladed stator wheel, the impeller, turbine and stator wheel disposed in toroidal fluid flow arrangement, for hydrokinetically driveably connecting the impeller and turbine.

* * * * *